June 7, 1932.  C. AHNERT  1,862,208
PROCESS OF MERCERIZING LOOSE COTTON
Filed July 10, 1928   2 Sheets-Sheet 2

Patented June 7, 1932

1,862,208

UNITED STATES PATENT OFFICE

CARL AHNERT, OF MASNOU-OCATA, NEAR BARCELONA, SPAIN

PROCESS OF MERCERIZING LOOSE COTTON

Application filed July 10, 1928, Serial No. 291,522, and in Germany August 5, 1927.

This invention relates to a method of mercerizing loose, unspun cotton which results in a perfection of mercerization and can be utilized for large volume commercial production. It provides practically a single-step process producing high luster of the cotton in the raw material itself and giving the cotton an exceedingly soft feeling. The cotton mercerized according to my new method possesses, moreover, an absolute uniformity after the finished merchandise is dyed which is a very desirable practical advantage, as it enables the mills to economize by using cheaper grades of cotton.

Figure 1:
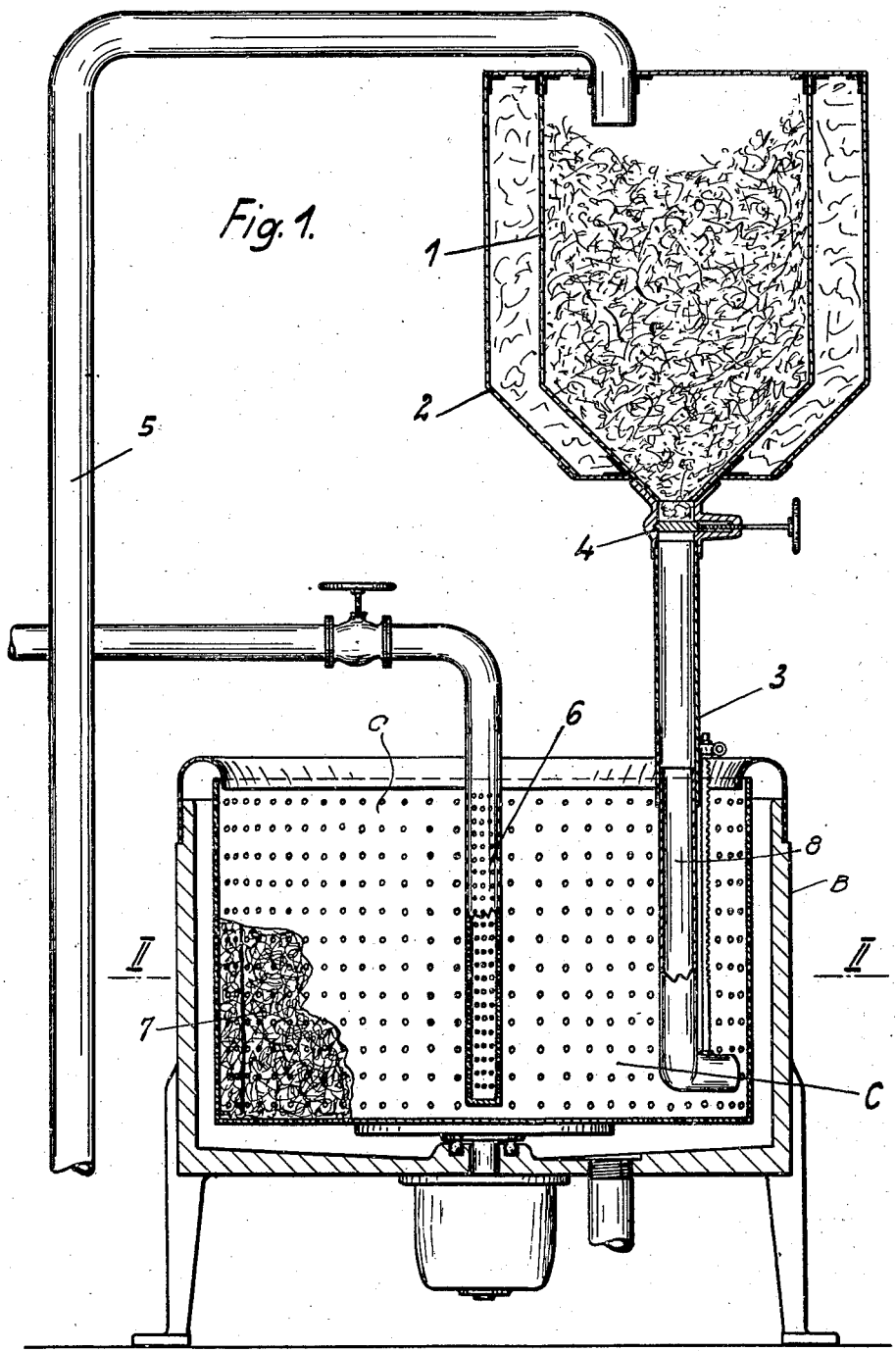
Figure 2:
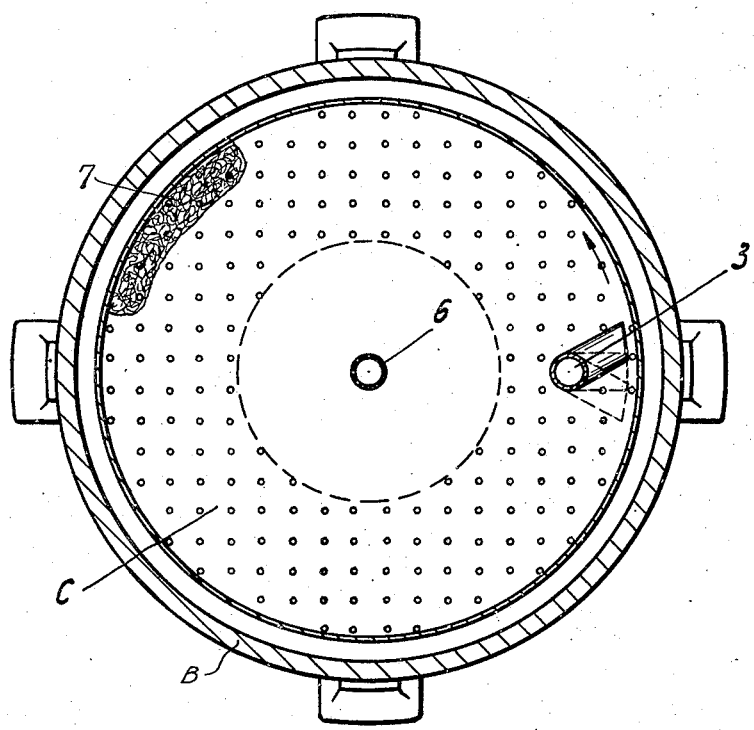

The drawings illustrate one form of apparatus for practicing the method. Fig. 1 is a vertical section, and Fig. 2 is a horizontal section of Fig. 1 taken on the line 2—2. Fig. 1 shows a housing or chamber B which can be supported in any suitable manner and which surrounds a centrifugal drum C. The inner surface of the cylinder or drum has suitably secured thereto an elastic lining 7 which may cover a portion or all of the inner surface of the centrifugal drum. The cotton together with the mercerizing solution is placed in a container 1 heated by a steam jacket 2 and passes out at the bottom of the container and through a pipe 3 into the centrifugal drum C. The lower part 8 of the pipe 3 is adjustable in telescoping relation to the upper part thereof to deliver the cotton in a helical or spiral stream upon the wall of the centrifugal drum C. The supply of cotton can be cut off by a valve 4, the mercerizing solution being collected and returned to the container 1 by a pipe 5, and the cotton on the elastic lining washed by water delivered from a pipe 6, having a valve for the control of the water supply.

It has been proposed to mercerize loose cotton by centrifugal force by charging the cotton fibres into a centrifugal drum at rest and pressing the same against the inner surface of the drum by means of an inserted shell the loose ends of which are lapping over in the resting position. However, on rotation of the centrifugal drum, due to circumferential movement of the lapped portions of the inner shell in opposite directions the direct action of centrifugal force on the cotton between the two shells rotating at practically the same speed is nil. There will result only a radial compression of the cotton against the wall of the outer shell. The fibres are not held under a positive uniform tensioning strain, but are held only by compression and adhesion which will not be effective to prevent shrinking of the cotton fibres.

My invention provides a mercerizing process and apparatus which is free from the above mentioned drawbacks.

The new method consists of impregnating the loose cotton at high temperature with a mercerizing solution and stretching the same by centrifugal force under the influence of the mercerizing solution. The stretching is maintained until the influence of the mercerizing solution which effects a contraction of the fibres, has been neutralized by lixiviation.

The stretching of the cotton fibres by centrifugal force can take place in two different manners.

The cotton saturated with a mercerizing solution is fed into a centrifugal rotating at high speed. Owing to the difference between the high speed of the centrifugal and the comparatively slower feeding speed of the material to be treated, the material by contact with the drum wall is stretched and extended. This action is accentuated as the fibres before being fed into the centrifugal, are first impregnated with hot mercerizing solution, then fed into the rapidly rotating centrifugal in hot condition with the mercerizing solution and thereby stretched. When the cotton with hot mercerizing solution is present in the centrifugal, the fibres on cooling down tend to shrink which, however, is prevented by their pressing tightly against the inner surface of the centrifugal owing to the centrifugal force. This results in an increasing of the tensioning strain and consequently also in a mercerizing action.

Or the cotton impregnated with a mercerizing solution is delivered into a centrifugal at rest. The inner surface of the cylinder of the centrifugal is lined with elastic material which expands under the action of the centrifugal force, and this expanding increases with the increasing centrifugal force so that the inner surface of the cylinder of the centrifugal gradually increases in diameter. When the centrifugal is being rotated, a stretching of the cotton fibres must take place, as the fibres bear against the inner surface of the cylinder of the centrifugal, the fibres lying the one on the other and being strongly pressed against this inner surface, while this bearing surface is enlarged. The cotton which is maintained in the stretched state, is also lixiviated whilst the centrifugal is rotating until the effect of the mercerizing solution is neutralized. Either of these methods may be used with the same apparatus.

The first working method, as illustrated by the drawings, is for instance as follows:

The container 1 is filled with a mercerizing solution, strong enough for the mercerizing effect to be obtained. The mercerizing solution is heated up to boiling temperature by means of superheated steam contained in a steam jacket 2 surrounding the container. The cotton is delivered into the mercerizing solution continually in flake-shape (dry or wet but well centrifuged). While the cotton is settling on the bottom plate of the container 1, it is exposed to the action of the mercerizing solution and discharged through the funnel-shaped bottom plate of the container 1, tapering to a discharge pipe 3, into the centrifugal C which is rotating at high speed. Between the lower end of the discharge pipe and the inner surface of the centrifugal sufficient space is left that the cotton and the pipe do not encounter one another. Furthermore, the discharge pipe 3 is so arranged that its lower part 8 can be adjusted vertically between the lower and upper ends of the centrifugal. The purpose of this adjusting of the discharge pipe is to force the cotton to be delivered in spiral shaped lines onto the inner surface of the centrifugal by lengthening or shortening the discharge pipe from the moment at which the mercerizing solution with the cotton enters in the same. Therefore, while the cotton is bearing on the inner surface of the centrifugal and is being delivered against the wall of the centrifugal by the discharge pipe, one layer of cotton is prevented from lying upon another layer of cotton when flowing into the centrifugal. After the inner surface of the cylinder of the centrifugal has been covered from below upward or inversely with mercerized cotton, the supply of the cotton is shut off at 4. The mercerizing solution flowing out of the centrifugal is collected in a reservoir provided in the bottom of the centrifugal and returned, with the aid of a pump, through the pipe 5 into the container 1. By a spraying device consisting of one or more pipes 6, extending into the center of the rotating centrifugal C and provided with holes through which the water is sprayed under pressure into the cotton, the mercerizing solution adhering to the cotton is lixiviated in the still rotating centrifugal.

The second working method consists of mounting a lining of sponge rubber or other compressible material directly against the inner surface of the cylindrical wall of the centrifugal so that it fills the centrifugal approximately up to half its height, when the centrifugal machine is at rest. Thus a free space remains at the center of the centrifugal into which the cotton impregnated with mercerizing solution is fed. When the centrifugal is then rotated, the sponge rubber is compressed by the action of the centrifugal force, and the cotton fibres pressed against the inner surface of the lining of sponge rubber are submitted to a stretching which produces the luster in the cotton. The gradually expanding elastic lining insures a uniform stretching effect which is imparted to all fibres. The lixiviating takes place whilst the centrifugal is still rotating.

The cotton saturated with mercerizing solution may also be charged into a centrifugal the inner surface of which gradually enlarges during the rotation of the centrifugal.

The discharge pipe 3 may be made in two parts, if necessary. As shown in Fig. 1, the lower part 8 provided with a discharge aperture is arranged shiftable in or over the upper part, in telescoping relation. This lower part is for instance provided with a longitudinal rack by means of which this lower part of the discharge pipe 3 can be adjusted by a pinion, adapted to be rotated by a crank or the like.

I claim:

1. The process of producing mercerized cotton which consists in saturating loose unspun cotton fibres with a mercerizing solution and then placing the saturated fibres under uniform tensioning strain maintained during lixiviation thereof.

2. The process of producing mercerized cotton which consists in saturating loose unspun cotton fibres with a mercerizing solution and then subjecting the saturated fibres to a progressively increasing tensioning strain and maintaining the fibres under substantially maximum tension during lixiviation thereof.

3. The process of producing mercerized cotton which consists in saturating unspun cotton fibres with a mercerizing solution and then feeding the saturated fibres into an annular zone of centrifugal pressure to maintain the fibres under uniform tensioning strain during lixiviation thereof.

4. The process of producing mercerized cotton which consists in saturating unspun cotton fibres with a mercerizing solution and then feeding the saturated fibres by gravity into an annular zone of centrifugal pressure to maintain the fibres under uniform tensioning strain during lixiviation thereof.

In testimony whereof I affix my signature.

CARL AHNERT.